E. N. MORLEY.
Improvement in Wheels for Vehicles.
No. 131,294. Patented Sep. 10, 1872.
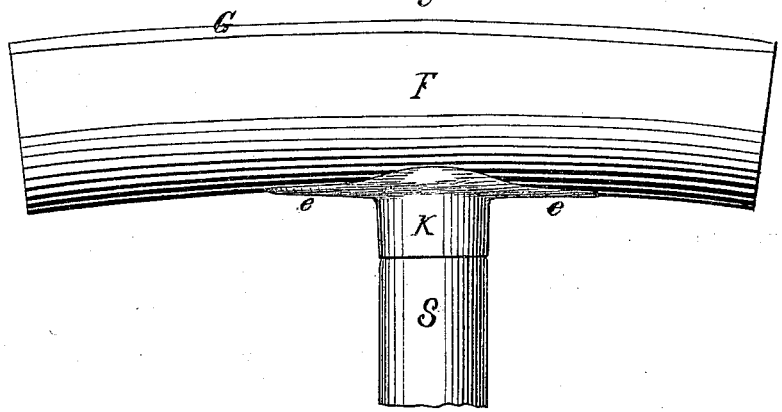
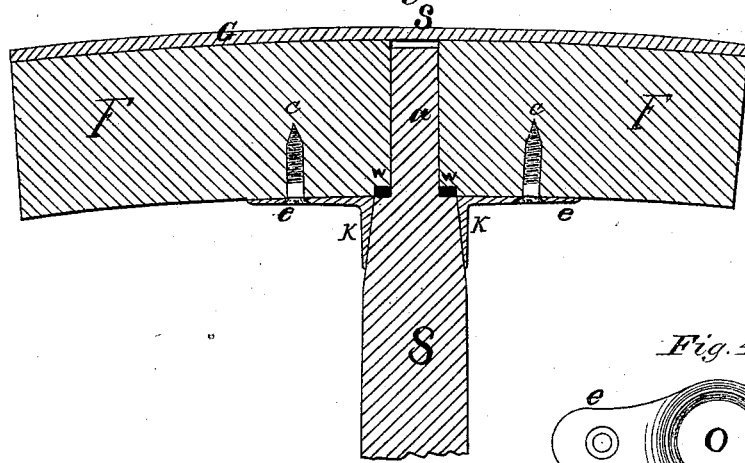
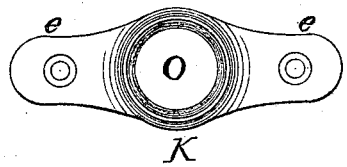
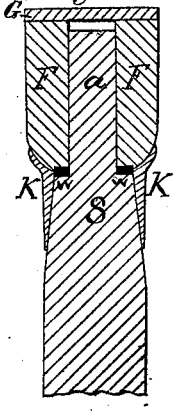
Witnesses:
C. F. Clure
Geo. P. Fisher
Inventor:
Edward N. Morley
by Chas. G. Fisher
Attorney

UNITED STATES PATENT OFFICE.

EDWARD N. MORLEY, OF WILMINGTON, DELAWARE.

IMPROVEMENT IN WHEELS FOR VEHICLES.

Specification forming part of Letters Patent No. 131,294, dated September 10, 1872.

SPECIFICATION.

Specification describing certain Improvements in Carriage Spokes and Fellies, invented by EDWARD N. MORLEY, of Wilmington, in the county of New Castle and State of Delaware.

My invention relates to the construction of carriage-wheels; and consists in connecting the spokes to the felly by means of a metallic socket, and the interposition of an elastic cushion or washer between the spoke and felly, all as hereinafter more fully explained.

Figure 1 is a side elevation of a portion of the felly with a spoke attached. Fig. 2 is a longitudinal central section of the same, and Fig. 3 a transverse section. Fig. 4 is a face view of the metal socket, shown detached.

To construct a wheel on my improved plan I secure the spokes in the hub in any desired manner, and then form on their opposite ends a tenon, $a$, of uniform diameter, and somewhat shorter than the width of the felly, as shown in Figs. 2 and 3. That portion of the spoke just above the shoulder formed by the tenon is slightly tapered, as represented in the drawing. I then provide a metal socket, K, which has a central hole, O, with projecting flanges $e$, as shown in Fig. 4. The hole O is made slightly tapering to correspond with the taper of the spoke, and the flanges $e$ are each provided with a hole for bolting it to the felly, as represented in Fig. 3. The felly F has holes bored through it to receive the tenons $a$, and on the inner side of the felly these holes are enlarged to a diameter equal to that of the tapered shoulder of the spoke, thus forming a socket, into which I insert a rubber washer, W, this washer being made in the form of a flat rubber ring, of proper size to encircle the tenon $a$ and fit in the recess in the felly, as shown in Figs. 2 and 3. It will be observed that the tenon on the spoke does not extend entirely through the felly, and that consequently it does not come in contact with the tire G, the entire weight being, therefore, thrown upon the taper walls of the metal socket K and the rubber packing W, whereby the wheel is rendered somewhat elastic, and the ends of the tenons are prevented from being broomed or split, as is the case where the ends of the spokes extend entirely through and rest directly against the tire, in the usual manner of constructing wheels.

It is obvious that, if desired, a rubber packing may also be inserted in the cavity between the end of the tenon and the tire, or that it may be used there only, instead of at the shoulder of the spoke, the result being the same. In the latter case the recess around the hole in the felly might be dispensed with, though I prefer the arrangement first described.

The metal socket K may be made of cast metal or forged in a die, the latter being done only when it is desired to make them very light and strong. They may be secured to the felly by screws C, as shown in Fig. 2, or by bolts extending through the felly and tire, according to circumstances.

By means of the taper socket the spokes are tightened up whenever the tire is shrunk on, and the strain being divided between it and the rubber there is much less possibility of the felly being injured by the spoke being jammed or forced into it, and thereby crushing or splitting the wood of the felly, as is a common occurrence in ordinary wheels; and by preventing the end of the felly from touching or resting on the tire it is also prevented from becoming bruised or split, which is also a common difficulty with wheels as now made; and at the same time there is imparted to the wheel a degree of elasticity which prevents it from injury by the concussion to which it is necessarily subjected in use, and causes it to run more smoothly and with less noise.

Having thus described my invention, what I claim is—

A carriage-wheel having the spokes S attached to the felly F by means of the short tenon $a$ and the metallic socket K, with the rubber washer W inserted between the shoulder of the spoke and the felly, all as herein described.

In testimony whereof I have signed my name to this specification in the presence of two subscribing witnesses.

EDWARD N. MORLEY.

Witnesses:
CHAS. G. FISHER,
A. I. AMBLER.